(12) United States Patent
Kamio

(10) Patent No.: US 11,001,235 B2
(45) Date of Patent: May 11, 2021

(54) VEHICLE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 16/559,917

(22) Filed: Sep. 4, 2019

(65) Prior Publication Data

US 2019/0389440 A1   Dec. 26, 2019

Related U.S. Application Data

(63) Continuation of application No. PCT/JP2018/010110, filed on Mar. 15, 2018.

(30) Foreign Application Priority Data

Mar. 29, 2017   (JP) .............................. JP2017-065392

(51) Int. Cl.
*B60W 10/10*   (2012.01)
*B60T 7/04*   (2006.01)
(Continued)

(52) U.S. Cl.
CPC ............. *B60T 7/045* (2013.01); *B60W 10/10* (2013.01); *B60W 10/182* (2013.01);
(Continued)

(58) Field of Classification Search
CPC .............. Y10T 477/647; B60W 10/18; B60W 30/18118; B60W 2710/186;
(Continued)

(56) References Cited

U.S. PATENT DOCUMENTS 8,220,877 B2   7/2012   Makishima et al.
2004/0016612 A1   1/2004   Iwagawa et al.
(Continued)

FOREIGN PATENT DOCUMENTS

JP   5-124493   5/1993
JP   2006-224739   8/2006
(Continued)

*Primary Examiner* — Roger L Pang
(74) *Attorney, Agent, or Firm* — Nixon & Vanderhye P.C.

(57) ABSTRACT

A brake control device is a control device for a vehicle used in a vehicle on which the shift-by-wire system and the brake-by-wire system are mounted. A function of automatically operating the brake device without an operation of the driver of the vehicle is referred to as a BBW automatic operation function, and a request by the driver for disabling the BBW automatic operation function is referred to as a disabling request. A brake control device includes a disabling determination part configured to determine a presence or absence of the disabling request, the vehicle stop determination part configured to determine whether the vehicle is stopped, a slope determination part configured to determine whether the vehicle is located on a slope, and a BBW automatic operation part. The BBW automatic operation part operates the brake device when the vehicle is stopped on the slope even if the disabling request is made.

8 Claims, 4 Drawing Sheets

(51) Int. Cl.
*B60W 10/18* (2012.01)
*B60W 30/18* (2012.01)
*B60T 1/06* (2006.01)

(52) U.S. Cl.
CPC ........ *B60W 30/18118* (2013.01); *B60T 1/062* (2013.01); *B60W 2510/104* (2013.01); *B60W 2520/04* (2013.01); *B60W 2520/10* (2013.01); *B60W 2540/10* (2013.01); *B60W 2710/10* (2013.01); *B60W 2710/18* (2013.01); *B60W 2710/186* (2013.01); *B60W 2710/188* (2013.01)

(58) Field of Classification Search
CPC ..... B60W 2710/188; B60W 2510/104; B60W 2520/04; B60W 2520/10; B60W 2540/10; B60W 2710/10; B60W 2710/18; B60T 7/045; B60T 1/062; B60T 7/122; B60T 8/17
See application file for complete search history.

(56) References Cited

U.S. PATENT DOCUMENTS

| | | |
|---|---|---|
| 2007/0173984 A1 | 7/2007 | Nakayama |
| 2008/0071456 A1 | 3/2008 | Shiraki |
| 2008/0086252 A1 | 4/2008 | Nakayama |
| 2008/0086253 A1 | 4/2008 | Nakayama |
| 2010/0294602 A1 | 11/2010 | Gustafsson et al. |
| 2012/0187750 A1 | 7/2012 | Kish et al. |
| 2015/0100222 A1* | 4/2015 | Beger ............... B60T 7/122 701/116 |
| 2017/0151936 A1* | 6/2017 | Takase ............... B60T 8/171 |
| 2017/0320499 A1* | 11/2017 | Bednarek ............ B60T 1/005 |
| 2018/0215355 A1* | 8/2018 | Kinder ............... B60T 8/245 |
| 2020/0198602 A1* | 6/2020 | Ishii ................. B60T 1/062 |

FOREIGN PATENT DOCUMENTS

| | | |
|---|---|---|
| JP | 2011-11579 | 1/2011 |
| JP | 2016-080124 | 5/2016 |
| WO | 2018/155332 | 8/2018 |

* cited by examiner

VEHICLE CONTROL DEVICE

CROSS REFERENCE TO RELATED APPLICATIONS

This application is a continuation application of International Patent Application No. PCT/JP2018/010110 filed on Mar. 15, 2018, which designated the U.S. and based on and claims the benefits of priority of Japanese Patent Application No. 2017-65392 filed on Mar. 29, 2017. The entire disclosure of all of the above applications is incorporated herein by reference.

TECHNICAL FIELD

The present disclosure relates to a vehicle control device.

BACKGROUND

A shift-by-wire system operates a shift range switching mechanism of a vehicle by a shift actuator using a motor or the like as a drive source.

SUMMARY

The vehicle control device includes a disabling determination part, a vehicle stop determination part, a slope determination part, and an BBW automatic operation part.

The disabling determination part determines the presence or absence of the disabling request.

The vehicle stop determination part determines whether the vehicle stops.

The slope determination part determines whether the vehicle is located on a slope.

The BBW automatic operation part operates the brake device by the BBW automatic operation function when the vehicle is located on the slope and the vehicle is stopped even when the disabling request is made.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, one embodiment will be described based on the drawings.

One Embodiment

Figure 1:
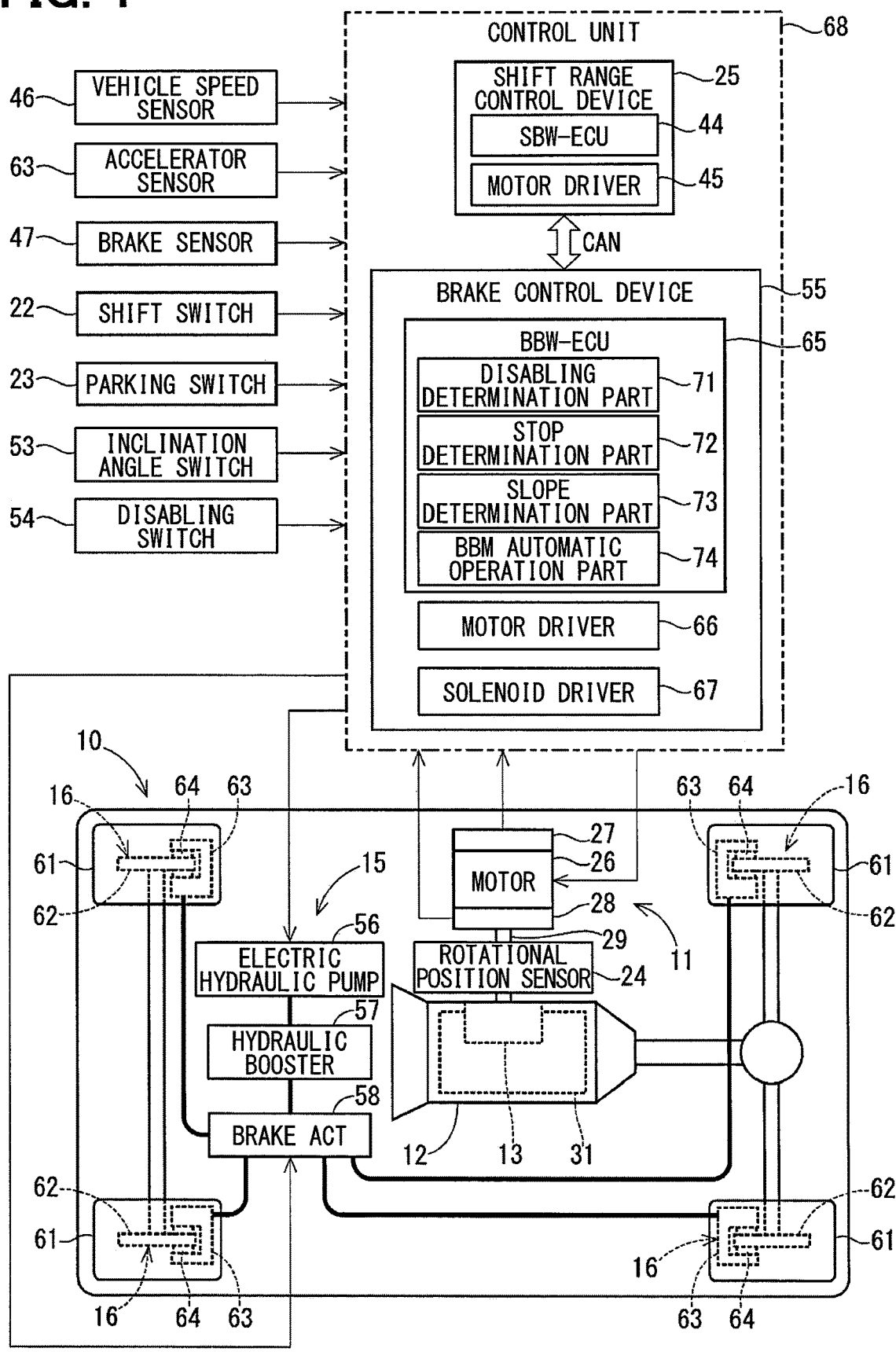
FIG. 1 is a conceptual diagram illustrating a vehicle to which a brake control device in an embodiment is applied.

A brake control device, which is a control device for a vehicle according to one embodiment, is used in a vehicle equipped with a shift-by-wire system (hereinafter, referred to as SBW system) and a brake-by-wire system (hereinafter, referred to as BBW system). As shown in FIG. 1, the SBW system 11 in a vehicle 10 is a system that electrically controls a shift range switching mechanism 13 of an automatic transmission 12. The BBW system 15 is a system that electrically controls the hydraulic brake device 16.

<Sbw System>

First, the configuration of the SBW system 11 will be described with reference to FIGS. 1 and 2.

As shown in FIG. 1, the SBW system 11 includes a shift actuator 21, a shift switch 22, a parking switch 23, a rotational position sensor 24, and a shift range control device 25.

The shift actuator 21 is an electric actuator that outputs rotational power, and includes a motor 26, an encoder 27, a reduction unit 28, and an output shaft 29. The encoder 27 detects a rotational position of the motor 26. The reduction unit 28 reduces the rotation of the motor 26. The output shaft 29 is connected to the shift range switching mechanism 13. When the output shaft 29 rotates, the shift range switching mechanism 13 operates, and a valve position of the range switching valve 32 provided in a hydraulic circuit 31 of the automatic transmission 12 changes. A shift range of the automatic transmission 12 is switched in accordance with the valve position of the range switching valve 32.

Figure 2:
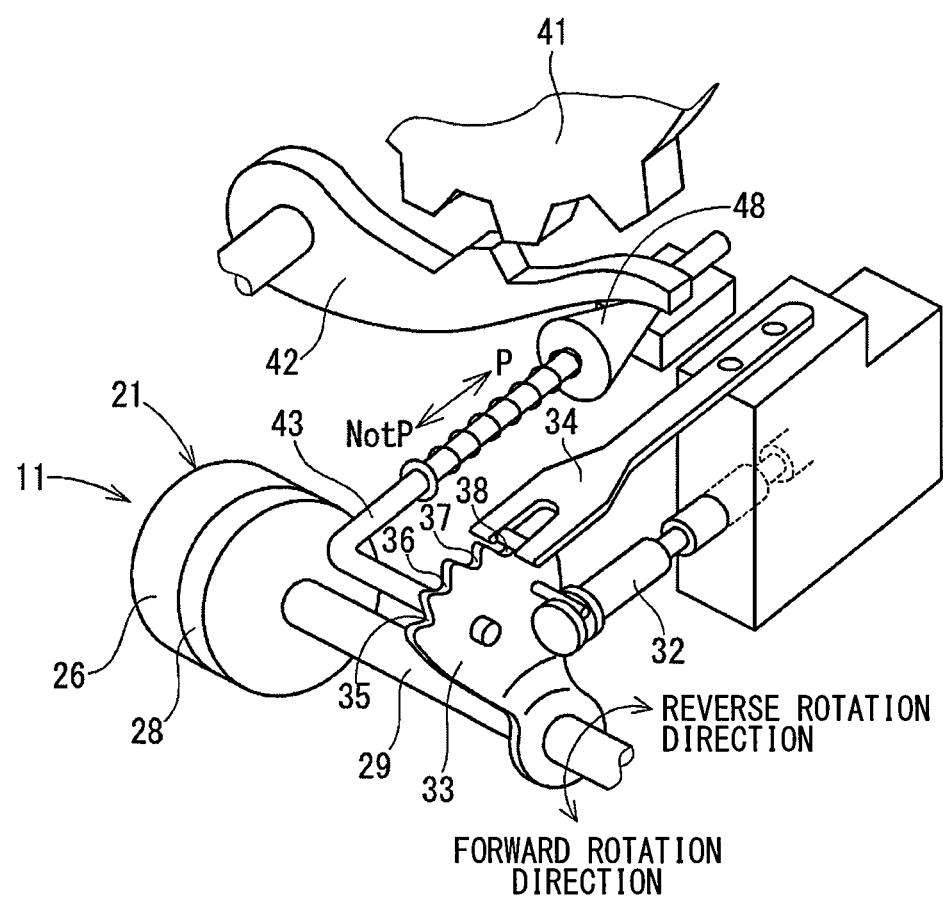
FIG. 2 is a perspective view of the shift range switching mechanism in FIG. 1.

As shown in FIG. 2, the shift range switching mechanism 13 (see, FIG. 1) has a detent plate 33 and a detent spring 34. The detent plate 33 rotates integrally with the output shaft 29 of the shift actuator 21. The valve position of the range switching valve 32 is changed as the detent plate 33 rotates. The detent spring 34 holds the rotational position of the detent plate 33 by being fitted into any one of the plurality of recesses 35 to 38 formed in the outer edge of the detent plate 33.

Further, the shift range switching mechanism 13 has a parking gear 41, a parking pole 42, and a parking rod 43 as components constituting a parking lock mechanism. The parking gear 41 rotates integrally with the output shaft of the automatic transmission 12. The parking pole 42 can move toward the parking gear 41 and move away from the parking gear 41, and engages with the parking gear 41 so as to lock the rotation of the output shaft of the automatic transmission 12. The parking rod 43 is connected to the detent plate 33. When the rotational position of the detent plate 33 is in a position corresponding to the parking range, a conical body 48 provided at a tip of the parking rod 43 is pushed to a lower side of the parking pole 42, whereby the parking pole 42 is pushed up. As a result, the parking pole 42 and the parking gear 41 are engaged with each other. The conical body 48 is flipped when the vehicle speed exceeds a predetermined speed.

Returning to FIG. 1, the shift switch 22 is operated by the driver of the vehicle 10, and outputs a signal according to the shift range requested by the driver (hereinafter, referred to as requested shift range). The required shift range by the shift switch 22 includes, for example, a neutral range, a reverse range, and a drive range.

The parking switch 23 is operated by the driver of the vehicle 10, and outputs a signal corresponding to a request for switching to the parking range by the driver.

The rotational position sensor 24 detects the rotational position of the output shaft 29, and outputs a signal corresponding to the rotational position.

The shift range control device 25 includes an electronic control unit 44 (hereinafter, referred to as SBW-ECU) mainly composed of a microcomputer, and a motor driver 45 including an inverter for controlling energization of a winding of the motor 26. A SBW-ECU 44 outputs a command signal for driving the shift actuator 21 in accordance with the output signals of a vehicle speed sensor 46, a brake sensor 47, the shift switch 22, and the parking switch 23. The motor driver 45 drives the shift actuator 21 in accordance with the command signal from the SBW-ECU 44. The shift range control device 25 drives the shift actuator 21 so as to control the shift range.

<BBW System>

Next, the configuration of the BBW system 15 will be described with reference to FIG. 1.

The BBW system 15 includes an electric hydraulic pump 56, a hydraulic booster 57, a brake actuator 58, the brake device 16, the brake sensor 47, an inclination angle sensor 53, a disabling switch 54, and a brake control device 55.

The hydraulic booster 57 increases the hydraulic pressure generated by the electric hydraulic pump 56 and outputs the pressure to the brake actuator 58.

The brake actuator 58 has a plurality of solenoid valves (not shown), and supplies the hydraulic pressure adjusted by the solenoid valves to the brake device 16.

The brake device 16 is a disc brake and generates a braking force by sandwiching the brake rotor 62 rotating with the wheel 61 from both sides with the brake pad 64 by using the brake caliper 63. The braking force changes in accordance with the magnitude of the hydraulic pressure supplied from the brake actuator 58.

The brake sensor 47 detects the speed at which the driver of the vehicle 10 depresses a brake pedal (not shown) and the amount of depression by the driver, and outputs a signal corresponding thereto.

The inclination angle sensor 53 detects an inclination angle of the vehicle 10 and outputs a signal corresponding to the inclination angle. The inclination angle of the vehicle 10 corresponds to the gradient of the road surface on which the vehicle 10 is located, and can be used to determine whether the vehicle 10 is located on a slope.

The disabling switch 54 is operated by the driver of the vehicle 10, and outputs a signal corresponding to the presence or absence of the disabling request of the BBW automatic operation function by the driver.

Here, the "BBW automatic operation function" is a function that applies a brake by automatically operating the brake device 16, when the predetermined conditions such as stopping the vehicle are met, for example. The BBW automatic operation function is used to release the driver from the brake operation, for example, in a signal waiting state. The BBW automatic operating function can be selectively disabled for the driver to avoid acceleration delays at the time of starting the vehicle. The request for the disablement is the above-mentioned "disabling request of the BBW automatic operation function".

The brake control device 55 includes an electronic control unit (hereinafter, BBW-ECU) 65 mainly composed of a microcomputer, a motor driver 66 including an inverter for controlling energization of a motor of the electric hydraulic pump 56, and a solenoid driver 67 for controlling the energization of the solenoid of the brake actuator 58. The BBW-ECU 65 outputs a command signal for driving the electric hydraulic pump 56 and the brake actuator 58 according to the output signals of the brake sensor 47, the inclination angle sensor 53, the disabling switch 54, and the like. The motor driver 66 drives the electric hydraulic pump 56 in response to the command signal from the BBW-ECU 65. The solenoid driver 67 drives the brake actuator 58 in response to the command signal from the BBW-ECU 65. The brake control device 55 drives the electric hydraulic pump 56 and the brake actuator 58 so as to control the operation of the brake device 16.

The brake control device 55 constitutes a control unit 68 of the vehicle 10 together with the shift range control device 25. The control unit 68 includes an engine control device, a parking brake control device, and the like (not shown). The output signals of the various sensors acquired by the control unit 68 are shared among the control devices through a communication path such as CAN, for example.

<BBW-ECU>

Next, the detailed configuration of the BBW-ECU 65 will be described with reference to FIG. 1.

Here, when the vehicle is stopped on the slope, the brake device 16 is automatically operated with the BBW automatic operation function, whereby the movement of the vehicle due to gravity is suppressed by the brake. Therefore, the present disclosure person has considered that the parking lock can be operated, even if the operation time of the shift range switching mechanism is relatively long. Then, the present disclosure person considered that the required torque of the shift actuator 21 for the parking lock could be reduced. The automatic actuation of the brake device 16 for this purpose is a completely new idea that has never been done before.

However, as in the conventional system, when the BBW automatic operation function is disabled by the disabling switch 54, and when the brake device 16 is configured not to be activated when the vehicle is stopped on the slope, a new problem arises that the required torque of the shift actuator 21 for the parking lock cannot be reduced.

As a configuration for solving such a problem, as shown in FIG. 1, the BBW-ECU 65 includes a disabling determination part 71 which is a functional unit related to control for automatically operating the brake device 16 (hereinafter, related to as BBW automatic operation control), a stop determination part 72, a slope determination part 73, and an BBW automatic operation part 74.

The disabling determination part 71 determines the presence or absence of a disabling request for the BBW automatic operation function based on the output signal of the disabling switch 54.

The stop determination part 72 determines whether the vehicle 10 has stopped based on the output signal of the vehicle speed sensor 46. For example, when the vehicle speed is 0, it is determined that the vehicle 10 has stopped.

The slope determination part 73 determines whether the vehicle 10 is positioned on the slope based on the output signal of the inclination angle sensor 53. When the inclination angle of the vehicle 10 is equal to or more than a predetermined value, it is determined that the vehicle 10 is located on a slope. When the inclination angle of the vehicle 10 is smaller than the predetermined value, it is determined that the vehicle 10 is not on the slope (the vehicle is located on the flat road).

The BBW automatic operation part 74 exerts an BBW automatic operation function when there is no disabling request. In the present embodiment, "to exert the BBW automatic operation function" means that the brake device 16 is operated so as to apply a brake when the vehicle is stopped.

In addition, even when there is the disabling request, the BBW automatic operation part 74 exerts the BBW automatic operation function when the vehicle 10 is positioned on the slope.

When the shift range is the travel range (that is, the drive range or the reverse range) and the accelerator is turned on in the operating state of the brake device 16, the BBW automatic operation part 74 releases the brake device 16 so as to release the brake.

Each of functional parts 71 to 74 possessed by the BBW-ECU 65 may be realized by hardware processing with a dedicated logic circuit, or by software processing by executing on a CPU a program stored in advance in a memory such as a computer readable non-transitory tangible recording medium, or by a combination of the hardware processing and the software processing. Which part of the functional parts 71 to 74 is realized by the hardware processing and which part is realized by the software processing can be appropriately selected.

<Process Executed by BBW-ECU>

Figure 3:
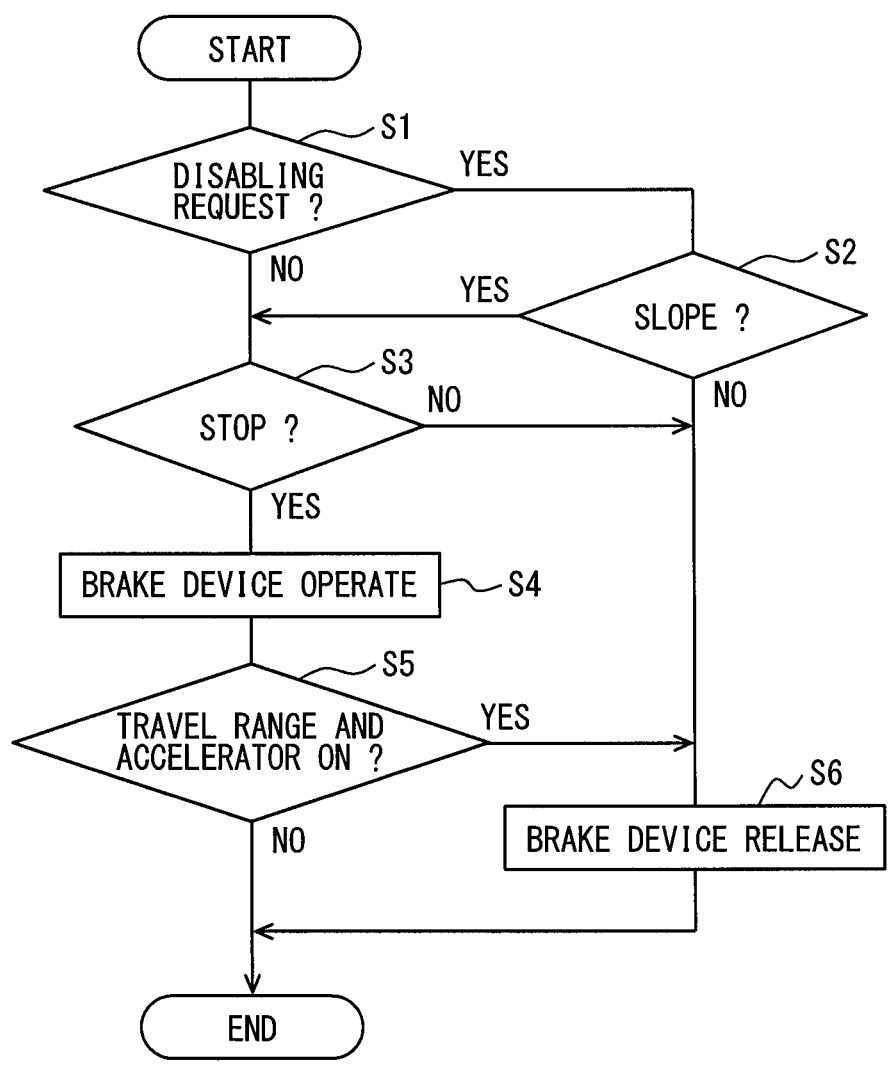
FIG. 3 is a flow chart for explaining processing executed by an electronic control unit of the brake control device in FIG. 1.

Next, a series of processes performed by the BBW-ECU 65 for BBW automatic operation control will be described with reference to FIGS. 1 and 3. A routine shown in FIG. 3 is repeatedly executed after activation of the BBW-ECU 65. Hereinafter, "S" means step.

In S1 of FIG. 3, the disabling determination part 71 determines whether or not there is the disabling request of the BBW automatic operation function, based on the output signal of the disabling switch 54.

If there is the disabling request of the BBW automatic operation function (S1: YES), the process proceeds to S2.

If there is no disabling request of the BBW automatic operation function (S1: NO), the process proceeds to S3.

In S2, the slope determination part 73 determines whether the vehicle 10 is positioned on the slope based on the output signal of the inclination angle sensor 53.

If the vehicle 10 is located on the slope (S2: YES), the process proceeds to S3.

If the vehicle 10 is not located on the slope (S2: NO), the process proceeds to S6.

In S3, the stop determination part 72 determines whether the vehicle 10 has stopped based on the output signal of the vehicle speed sensor 46.

When the vehicle 10 is stopped (S3: YES), the process proceeds to S4.

If the vehicle 10 is not stopped (S3: NO), the process proceeds to S6.

In S4, the BBW automatic operation part 74 operates the brake device 16 to apply the brake. After S4, the processing proceeds to S5.

In S5, the BBW automatic operation part 74 determines whether the shift range is the travel range and the accelerator is on.

If the shift range is the travel range and the accelerator is on (S5: YES), the process proceeds to S6.

When the shift range is not the travel range or when the accelerator is off (S5: NO), the process exits the routine of FIG. 3.

In S6, the BBW automatic operation part 74 releases the brake device 16 so as to release the brake. After S6, the process exits the routine of FIG. 3.

Specific Operation Example

Next, an example of the operation by the BBW-ECU 65 will be described with reference to FIG. 4.

Figure 4:
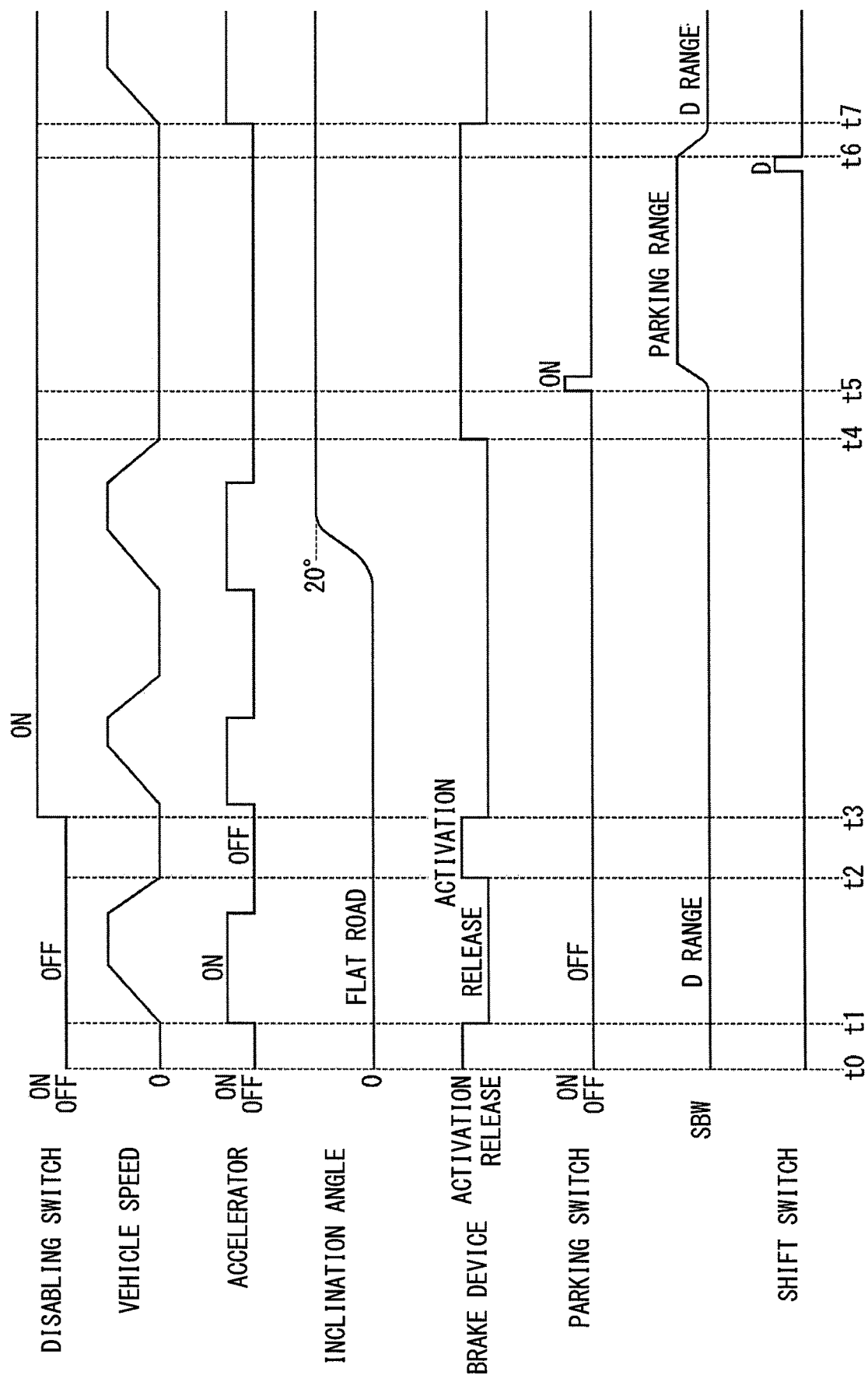
FIG. 4 is a time chart showing an example of an operation according to the process in FIG. 3.

At time t0 in FIG. 4, since the disabling switch 54 is off (i.e., there is no disabling request) and the vehicle speed is 0 (i.e., the vehicle is stopped), the brake device 16 is activated by the BBW automatic operation function.

At time t1 in FIG. 4, when the disabling switch 54 is off and the vehicle speed is 0, the shift range is the drive range and the accelerator is on, so the brake device 16 is in the released state. At this time t1, the determination of S5 of FIG. 3 is affirmed, and the process of S6 is performed.

At time t2 in FIG. 4, the vehicle speed becomes 0 when the disabling switch 54 is off, so the brake device 16 is activated. At this time point t2, the process of S4 of FIG. 3 is executed.

At time t3 in FIG. 4, since the disabling switch 54 is turned on (that is, there is the disabling request), and the inclination angle is 0 (that is, the vehicle 10 is not located on the slope), the brake device 16 is in the released state. At this time t3, the determination of S1 of FIG. 3 is affirmed and the determination of S2 is denied, and the process of S6 is executed.

At time t4 in FIG. 4, when the disabling switch 54 is ON and the inclination angle is not 0 (that is, the vehicle 10 is located on the slope), the vehicle speed becomes 0, so the brake device 16 is activated. At this time t4, the determination of S1 in FIG. 3 is affirmed, the determination of S2 is affirmed, and the determination of S3 is affirmed, and the process of S4 is executed.

Since the parking switch 23 is turned on at time t5 in FIG. 4, the shift range control device 25 drives the shift actuator 21 so as to switch the shift range from the drive range to the parking range. While the shift range is switched from the drive range to the parking range, the brake device 16 is in operation state and the movement of the vehicle due to gravity is suppressed. Therefore, the parking lock can be performed even if the operation time of the shift range switching mechanism 13 after time t5 is relatively long.

At time t6 in FIG. 4, since the instruction of the drive range instruction by the shift switch 22 is determined, the shift range control device 25 drives the shift actuator 21 to switch the shift range from the parking range to the drive range. During the time t4 to t6, the movement of the vehicle due to gravity is suppressed by the brake device 16. As a result, the force for moving the vehicle due to gravity is less likely to be applied to the engaging portion between the parking gear 41 and the parking pole 42. Therefore, the shift actuator 21 can easily remove the parking pole 42 from the parking gear 41 at time t6. That is, an increase in motor torque necessary for releasing the engagement is suppressed.

Since the shift range is the drive range and the accelerator is on at time t7 in FIG. 4, the brake device 16 is in the released state. At this time t7, the determination of S5 of FIG. 3 is affirmed, and the process of S6 is performed.

<Advantages>

As described above, in the present embodiment, the brake control device 55 includes the disabling determination part 71, the vehicle stop determination part 72, the slope determination part 73, and the BBW automatic operation part 74.

The disabling determination part 71 determines the presence or absence of the disabling request.

The vehicle stop determination part 72 determines whether the vehicle 10 is stopped.

The slope determination part 73 determines whether the vehicle 10 is located on the slope.

The BBW automatic operation part 74 operates the brake device 16 by the BBW automatic operation function when the vehicle 10 is located on the slope and the vehicle 10 is stopped even when the disabling request is made.

As described above, when the vehicle 10 is stopped on the slope, the movement of the vehicle 10 due to gravity is suppressed by the brake device 16 by automatically operating the brake device 16 regardless of the disabling request. Therefore, the parking lock can be performed even if the operation time of the shift range switching mechanism 13 of the shift-by-wire system 11 is relatively long. Therefore, since the torque of the shift actuator 21 required at the time of parking lock is reduced, the size of the shift actuator 21 can be reduced.

OTHER EMBODIMENTS

In other embodiment, the conditions for activating the brake device by the BBW automatic operation function may include conditions other than that the vehicle is stopping.

In other embodiments, the braking device may be a mechanical force actuated brake rather than a hydraulically actuated brake. That is, the brake actuator may be composed of, for example, an electric motor instead of a hydraulic device that supplies hydraulic pressure to the brake device, and may output mechanical force to the brake device. That is, the brake-by-wire system may include an electric brake and a brake control device that controls the electric brake.

In other embodiment, the brake device is not limited to the disc type, and may be another type such as a drum type or the like.

In other embodiments, the brake device may be provided not only on all the wheels of the vehicle but only on the front wheels or the rear wheels, or may be provided on, for example, a drive shaft other than the wheels.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

In an assumable example, a shift-by-wire system operates a shift range switching mechanism of a vehicle by a shift actuator using a motor or the like as a drive source. In this system, it is not necessary to mechanically connect the shift range switching mechanism and an operation part thereof. Therefore, the installation place of the operation part and the degree of freedom in design are increased.

By the way, in the current shift range switching mechanism, a ratchet mechanism is configured so that parking lock cannot be performed when the vehicle speed becomes equal to or higher than a predetermined speed. Therefore, on a slope, if the shift actuator is not operated quickly, the vehicle slips down, the vehicle speed increases, and the parking lock cannot be performed.

On the other hand, in the shift range switching mechanism, the shape of the detent plate is devised in order to shorten the time required for the parking lock.

By the way, in recent years, there has been a demand for downsizing of the shift actuator in order to improve mountability on the vehicle and the like. However, if the shift actuator is downsized, the output torque is reduced and it takes time to operate the shift range switching mechanism. Therefore, as a result of taking time until parking lock completion, the parking lock on the slope may become difficult.

In order to reduce the time of the parking lock, it is also considered that the shape modification of a detent plate in Patent Document 1 is effective. However, there is a limit to shortening the parking lock time by devising the shape of the detent plate, and further improvement for downsizing of the shift actuator is desired.

It is an object of the present disclosure to provide a vehicle control device that can miniaturize the shift actuator of the shift-by-wire system.

In the vehicle equipped with the brake-by-wire system, there is a function (hereinafter referred to as a BBW automatic operation function) of automatically operating the brake device of the brake-by-wire system when predetermined conditions such as stopping are met. The BBW automatic operation function is used to release the driver from the brake operation, for example, in a signal waiting state. The operating state of the brake device by the BBW automatic operation function is released, for example, by the accelerator on.

When the vehicle is stopped on the slope, the brake device is automatically operated, whereby the movement of the vehicle due to gravity is suppressed by the brake. Therefore, the present disclosure person has considered that the parking lock can be operated, even if the operation time of the shift range switching mechanism was relatively long. Then, the present disclosure person considered that the required torque of the shift actuator for the parking lock could be reduced. The automatic actuation of the brake device for this purpose is a completely new idea that has never been done before.

However, in the current brake-by-wire system, the BBW automatic operation function can be selectively disabled for the driver to avoid an acceleration delay at the timing of starting. As described above, when the BBW automatic operation function is disabled, the brake device is not operated when the vehicle stops on the slope, so that there arises a new problem that the torque required by the shift actuator for parking lock cannot be reduced.

The present disclosure person completed the present disclosure based on this finding.

The present disclosure is a vehicle control device that is used in a vehicle equipped with a shift-by-wire system and an brake-by-wire system.

Here, the function of automatically operating the brake device of the brake-by-wire system without the operation of the driver of the vehicle is referred to as the BBW automatic operation function, and the request by the driver for disabling the BBW automatic operation function is referred to as a disabling request.

The vehicle control device includes a disabling determination part, a vehicle stop determination part, a slope determination part, and an BBW automatic operation part.

The disabling determination part determines the presence or absence of the disabling request.

The vehicle stop determination part determines whether the vehicle stops.

The slope determination part determines whether the vehicle is located on a slope.

The BBW automatic operation part operates the brake device by the BBW automatic operation function when the vehicle is located on the slope and the vehicle is stopped even when the disabling request is made.

As described above, when the vehicle is stopped on the slope, the movement of the vehicle due to gravity is suppressed by the brake device by automatically operating the brake device regardless of the disabling request. Therefore, the parking lock can be performed even if the operation time of the shift range switching mechanism of the shift-by-wire system is relatively long. Therefore, since the torque of the shift actuator required at the time of parking lock is reduced, the size of the shift actuator can be reduced.

The invention claimed is:

1. A vehicle control device that is used in a vehicle equipped with a shift-by-wire system and a brake-by-wire system, comprising:

when the function of automatically operating the brake device of the brake-by-wire system without the operation of a driver of the vehicle is referred to as the BBW automatic operation function, and a request by the driver for disabling the BBW automatic operation function is referred to as a disabling request, a disabling determination part configured to determine the presence or absence of the disabling request;

a stop determination part configured to determine whether the vehicle is stopped or not;

a slope determination part configured to determine whether the vehicle is located on a slope; and a BBW automatic operation part configured to operate the brake device by the BBW automatic operation function when the vehicle is stopped on the slope, when the brake device by the BBW automatic operation function is not operating and the disabling request was made.

2. The vehicle control device according to claim 1, wherein the BBW automatic operation part continues an operating state of the brake device that was activated when the vehicle is stopped on the slope during the disabling request, while, a shift range control device drives a shift actuator to switch a shift range from a drive range to a parking range.

3. The vehicle control device according to claim 1, wherein the BBW automatic operation part releases an operating state of the brake device that was activated when the vehicle is stopped on the slope during the disabling request, when the shift range is a travel range and an accelerator is turned on.

4. The vehicle control device according to claim 2, wherein the BBW automatic operation part releases an operating state of the brake device that was activated when the vehicle is stopped on the slope during the disabling request, when the shift range is a travel range and an accelerator is turned on.

5. A vehicle control device that is used in a vehicle equipped with a shift-by-wire system and an electric parking brake system, comprising:

when the function of automatically operating the electric parking brake without an operation of a driver of the vehicle is referred to as a BBW automatic operation function, and a request by the driver for disabling the BBW automatic operation function is referred to as an disabling request, a processor configured to;

determine a presence or absence of the disabling request;

determine whether the vehicle is stopped or not;

determine whether the vehicle is located on a slope; and operate the brake device by the BBW automatic operation function when the vehicle is stopped on the slope, when the brake device by the BBW automatic operation function is not operating and the disabling request was made.

6. The vehicle control device according to claim 5, wherein the processor is configured to continue an operating state of the brake device that was activated when the vehicle is stopped on the slope during the disabling request, while a shift range control device drives a shift actuator to switch a shift range from a drive range to a parking range.

7. The vehicle control device according to claim 6, wherein the processor is configured to release an operating state of the brake device that was activated when the vehicle is stopped on the slope during the disabling request, when the shift range is a travel range and an accelerator is turned on.

8. A vehicle control device that is used in a vehicle equipped with a shift-by-wire system and an electric parking brake system, comprising:

when the function of automatically operating the electric parking brake without an operation of a driver of the vehicle is referred to as a BBW automatic operation function, and a request by the driver for disabling the BBW automatic operation function is referred to as an disabling request, a processor configured to;

determine a presence or absence of the disabling request;

determine whether the vehicle is stopped or not;

determine whether the vehicle is located on a slope;

operate the brake device by the BBW automatic operation function when the vehicle is stopped on the slope, while the disabling request is made; and continue an operating state of the brake device that was activated when the vehicle is stopped on the slope during the disabling request, while a shift range control device drives a shift actuator to switch a shift range from a drive range to a parking range.

\* \* \* \* \*